US011686286B2

(12) United States Patent
Chen et al.

(10) Patent No.: US 11,686,286 B2
(45) Date of Patent: Jun. 27, 2023

(54) WIND POWER GENERATION APPARATUS

(71) Applicant: HERO POWER TECHNOLOGY CORPORATION, New Taipei (TW)

(72) Inventors: Tai-Wei Chen, Chiayi (TW); Yu-Shun Yeh, Taoyuan (TW); Nariie Omori, Kanagawa-Ken (JP)

(73) Assignee: HERO POWER TECHNOLOGY CORPORATION, New Taipei (TW)

( * ) Notice: Subject to any disclaimer, the term of this patent is extended or adjusted under 35 U.S.C. 154(b) by 251 days.

(21) Appl. No.: 17/312,926

(22) PCT Filed: Dec. 23, 2019

(86) PCT No.: PCT/IB2019/061262
§ 371 (c)(1),
(2) Date: Jun. 10, 2021

(87) PCT Pub. No.: WO2020/136544
PCT Pub. Date: Jul. 2, 2020

(65) Prior Publication Data
US 2022/0034299 A1    Feb. 3, 2022

(30) Foreign Application Priority Data

Dec. 24, 2018  (TW) ................................. 107146804

(51) Int. Cl.
*F03D 7/02*  (2006.01)
*F03D 1/04*  (2006.01)
*F03D 1/06*  (2006.01)

(52) U.S. Cl.
CPC ............. *F03D 7/0244* (2013.01); *F03D 1/04* (2013.01); *F03D 1/0633* (2013.01); *F03D 7/02* (2013.01); *F05B 2260/903* (2013.01)

(58) Field of Classification Search
CPC . F03D 1/04; F03D 1/0633; F03D 7/02; F03D 7/0244; F05B 2260/903
See application file for complete search history.

(56) References Cited

U.S. PATENT DOCUMENTS

2020/0018286 A1*  1/2020  Miyake ................ H02K 1/2791

FOREIGN PATENT DOCUMENTS

WO  WO-2018143452 A1 *  8/2018  ............... F03D 1/04

* cited by examiner

*Primary Examiner* — Audrey B. Walter
(74) *Attorney, Agent, or Firm* — Li & Cai Intellectual Property Office

(57) ABSTRACT

A wind power generation apparatus includes a rotating shaft, a wind power generation device assembled to the rotating shaft, and an acceleration restriction mechanism. The wind power generation device includes a drag blade fixed on the rotating shaft, an inner housing connected to an outer edge of the drag blade, and an outer housing sleeved around the inner housing. The acceleration restriction mechanism includes a plurality of swing arms pivotally connected to the inner housing and a metal ring fixed on the outer housing. A magnetic portion of each swing arm is movable relative to the inner housing from an initial position to an acceleration restriction position. When the magnetic portion of each swing arm is at the acceleration restriction position, the magnetic portion at least partially covers the metal ring, so that the metal ring generates an eddy current limiting a rotating acceleration of the drag blade.

10 Claims, 16 Drawing Sheets

WIND POWER GENERATION APPARATUS

CROSS-REFERENCE TO RELATED PATENT APPLICATION

The present application is the U.S. national stage of International Application PCT/IB2019/061262, filed Dec. 23, 2019, which international application was published on Jul. 2, 2020, as International Publication No. WO2020/136544. The international Application claims priority to Taiwan Patent Application No. 107146804, filed on Dec. 24, 2018, the contents of which are incorporated herein by reference in their entireties.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electricity generation apparatus, and more particularly to a wind power generation apparatus.

BACKGROUND OF THE DISCLOSURE

A conventional wind power generation apparatus (e.g., a horizontal axis wing turbine) uses a plurality of lift blades to be driven by a wind force, so that the wind force can be used as a power source for electricity generation. When the conventional wind power generation apparatus is operated in high speed winds, the high speed winds may drive the conventional wind power generation apparatus to have a high rotating acceleration that rapidly increases a rotating speed of the blades, which results in damage to inner components thereof. Accordingly, the conventional wind power generation apparatus may use an electronic braking mechanism to reduce the rotating speed. However, the electronic braking mechanism is only applied to the conventional wind power generation apparatus operated in sudden high speed winds, but cannot be applied to the conventional wind power generation apparatus operated in continuously high speed winds.

SUMMARY OF THE DISCLOSURE

In response to the above-referenced technical inadequacies, the present disclosure provides a wind power generation apparatus to effectively improve on the issues associated with conventional wind power generation apparatuses.

In one aspect, the present disclosure provides a wind power generation apparatus, which includes a rotating shaft, a wind power generation device, and an acceleration restriction mechanism. The rotating shaft defines an axial direction parallel to a longitudinal direction thereof. The wind power generation device is assembled to the rotating shaft, and includes a rotor assembly and a stator assembly. The rotor assembly includes a drag blade, an inner housing, a first magnetically attractable module, and a second magnetically attractable module. The drag blade is in a spiral shape and is fixed on the rotating shaft. The inner housing is in a ring-shape and is connected to an outer edge of the drag blade. The first magnetically attractable module and the second magnetically attractable module are assembled to an outer surface of the inner housing and are spaced apart from each other. The first magnetically attractable module and the second magnetically attractable module face each other and have a magnetic force there-between. The stator assembly includes an outer housing and an induction module. The outer housing is sleeved around the inner housing. The induction module is fixed on an inner surface of the outer housing. When the drag blade is driven by a wind force, the rotor assembly is rotated relative to the stator assembly by taking the rotating shaft as a rotation axis, and a region between the first magnetically attractable module and the second magnetically attractable module passes through the induction module so as to allow the induction module to generate an induction current. The acceleration restriction mechanism is disposed between the inner housing and the outer housing, and includes N number of swing structures and a metal ring. Each of the swing structures has at least one swing arm, and N is a positive integer greater than one. The at least one swing arm of each of the swing structures includes a pivotal portion and a magnetic portion. In the at least one swing arm of each of the swing structures, the pivotal portion is pivotally connected to the inner housing, and the magnetic portion is movable relative to the inner housing from an initial position to an acceleration restriction position by a centrifugal force that is generated from the rotor assembly in rotation. The metal ring is fixed on the outer housing. When the magnetic portion of the at least one swing arm of each of the swing structures is at the acceleration restriction position, the magnetic portion at least partially covers the metal ring along the axial direction, so that the metal ring generates an eddy current limiting a rotating acceleration of the rotor assembly.

In one aspect, the present disclosure provides a wind power generation apparatus, which includes a rotating shaft, a wind power generation device, and an acceleration restriction mechanism. The rotating shaft defines an axial direction parallel to a longitudinal direction thereof. The wind power generation device is assembled to the rotating shaft, and includes a rotor assembly and a stator assembly. The rotor assembly includes a drag blade, an inner housing, a first magnetically attractable module, and a second magnetically attractable module. The drag blade is in a spiral shape and is fixed on the rotating shaft. The inner housing is in a ring-shape and is connected to an outer edge of the drag blade. The first magnetically attractable module and the second magnetically attractable module are assembled to an outer surface of the inner housing and are spaced apart from each other. The first magnetically attractable module and the second magnetically attractable module face each other and have a magnetic force there-between. The stator assembly includes an outer housing and an induction module. The outer housing is sleeved around the inner housing. The induction module is fixed on an inner surface of the outer housing. When the drag blade is driven by a wind force, the rotor assembly is rotated relative to the stator assembly by taking the rotating shaft as a rotation axis, and a region between the first magnetically attractable module and the second magnetically attractable module passes through the induction module so as to allow the induction module to generate an induction current. The acceleration restriction mechanism is disposed between the inner housing and the outer housing, and includes N number of swing structures and a metal ring. Each of the swing structures has at least one swing arm, and N is a positive integer greater than one.

The at least one swing arm of each of the swing structures includes a pivotal portion and a metal portion. In the at least one swing arm of each of the swing structures, the pivotal portion is pivotally connected to the inner housing, and the metal portion is movable relative to the inner housing from an initial position to an acceleration restriction position by a centrifugal force that is generated from the rotor assembly in rotation. The magnetic ring is fixed on the outer housing. When the metal portion of the at least one swing arm of each of the swing structures is at the acceleration restriction position, the metal portion at least partially covers the magnetic ring along the axial direction, so that the metal portion generates an eddy current limiting a rotating acceleration of the rotor assembly.

Therefore, the wind power generation apparatus of the present disclosure uses the acceleration restriction mechanism arranged therein to generate an eddy current in the metal ring for reducing the rotating acceleration of the rotor assembly, so that the wind power generation apparatus can be operated in continuously high speed winds.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
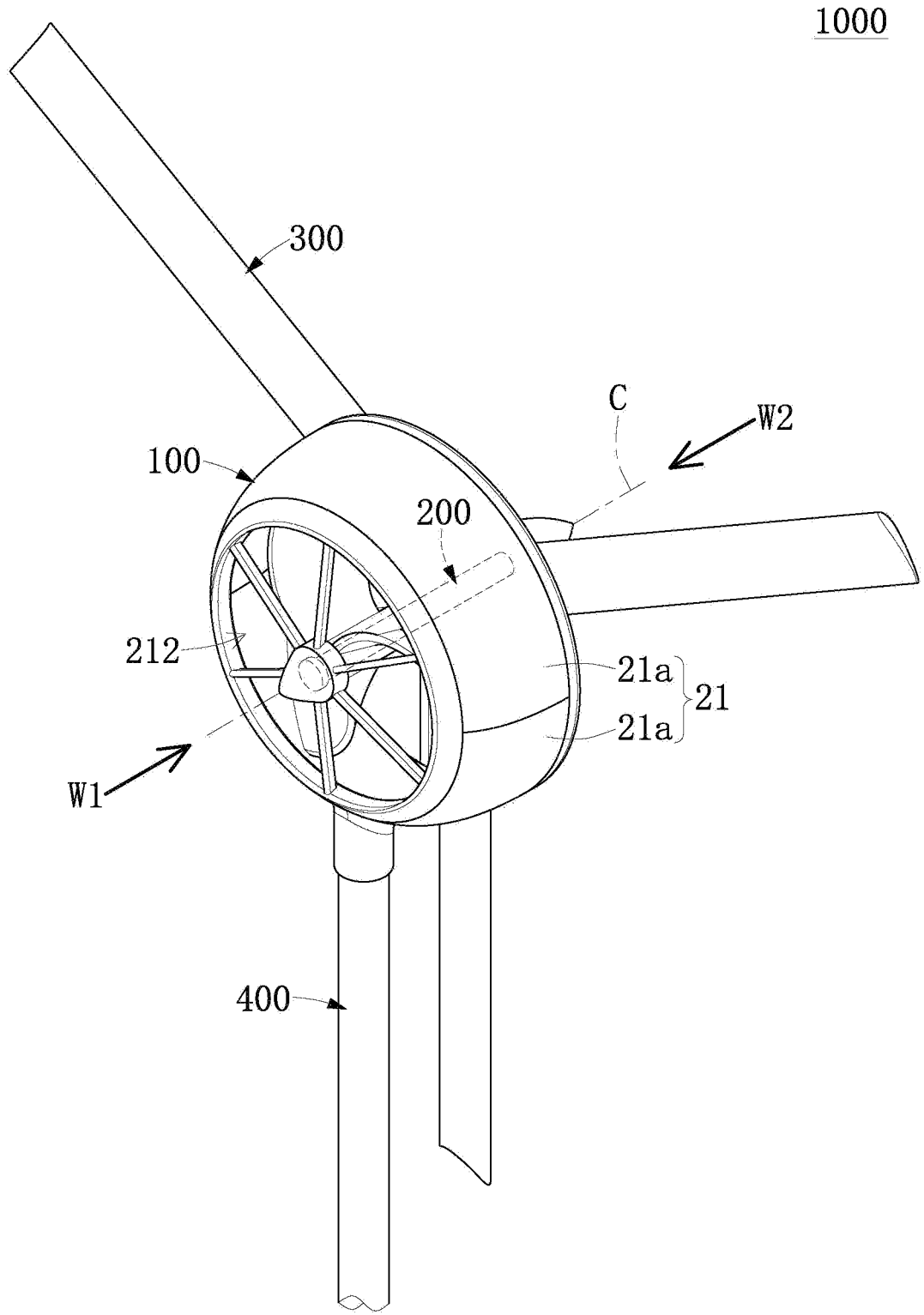
FIG. 1 is a perspective view of a wind power generation apparatus according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 13, a first embodiment of the present disclosure provides a wind power generation apparatus 1000. The wind power generation apparatus 1000 can be horizontal axis type wind power generation equipment, but the present disclosure is not limited thereto. Moreover, the structural design of the wind power generation apparatus 1000 in the present embodiment is different from that of a water electricity generation apparatus, so that no water electricity generation apparatus can provide any motivation to the structural design of the present embodiment.

As shown in FIG. 1 to FIG. 4, the wind power generation apparatus 1000 includes a rotating shaft 200, a lift blade set 300 fixed on the rotating shaft 200, a wind power generation device 100 assembled to the rotating shaft 200, a supporting stand 400 connected to the wind power generation device 100, and an acceleration restriction mechanism 500 that is in cooperation with the wind power generation device 100. Each component of the wind power generation apparatus 1000 (e.g., the lift blade set 300 or the supporting stand 400) can be adjusted or omitted according to design requirements. The following description describes the structure and connection relationship of each component of the wind power generation apparatus 1000.

As shown in FIG. 1 to FIG. 4, the rotating shaft 200 is in a cylindrical shape, and is fixed to (or assembled with) the lift blade set 300 and the wind power generation device 100 through a plurality of bearings (not labeled) and fixing members (e.g., screws), so that the lift blade set 300 and the wind power generation device 100 can be simultaneously operated through the rotating shaft 200. The rotating shaft 200 defines an axial direction C parallel to a longitudinal direction thereof for ease of illustration in the following description.

The lift blade set 300 in the present embodiment includes a plurality of lift blades (not labeled). An end of each of the lift blades is substantially perpendicularly connected to the rotating shaft 200, and the lift blades are preferably arranged in the same angle (i.e., any two of the lift blades adjacent to each other have the same angle), but the present disclosure is not limited thereto.

Figure 5:
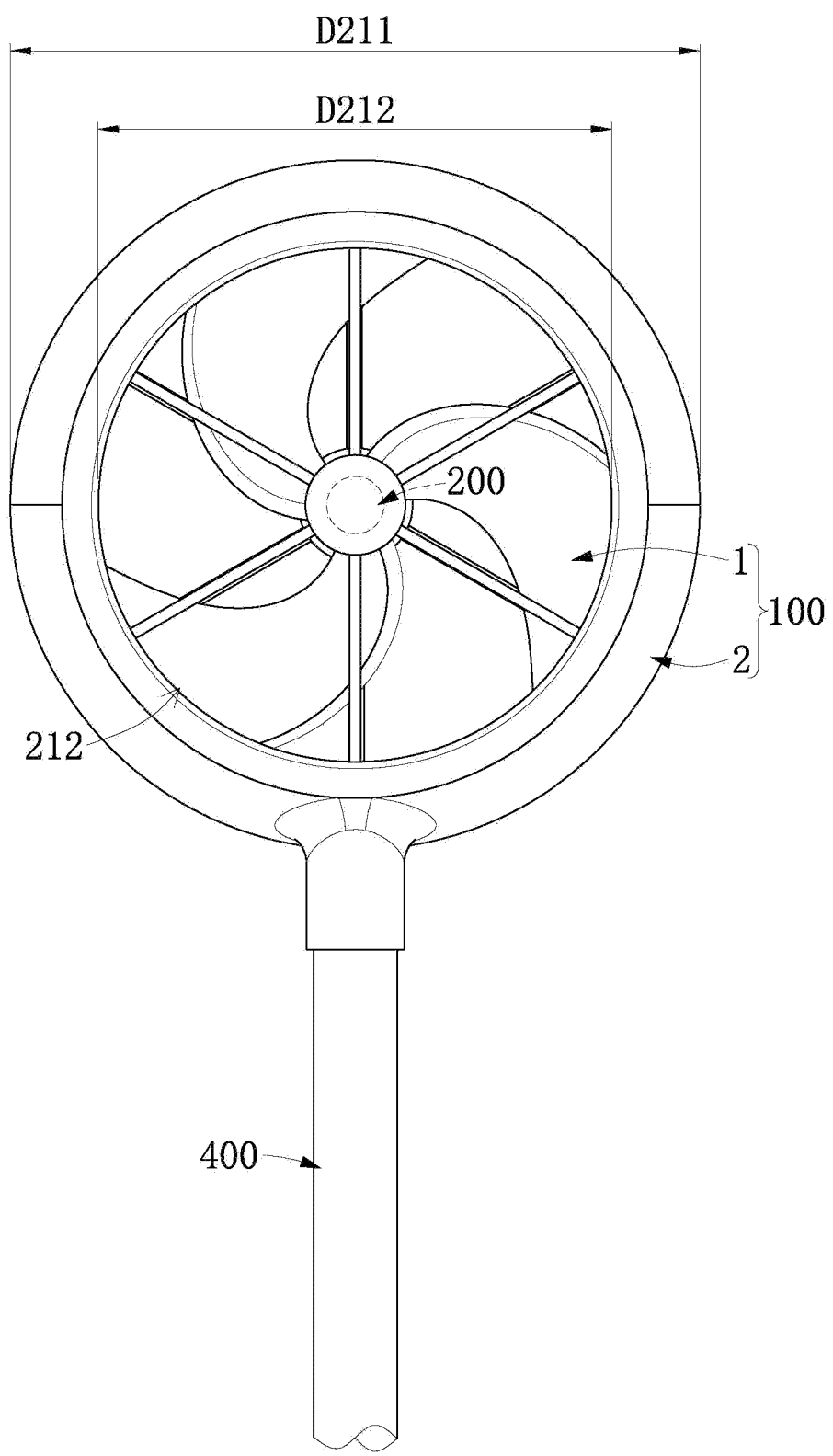
FIG. 5 is a planar view of FIG. 1 when a lift blade set is omitted.
Figure 6:
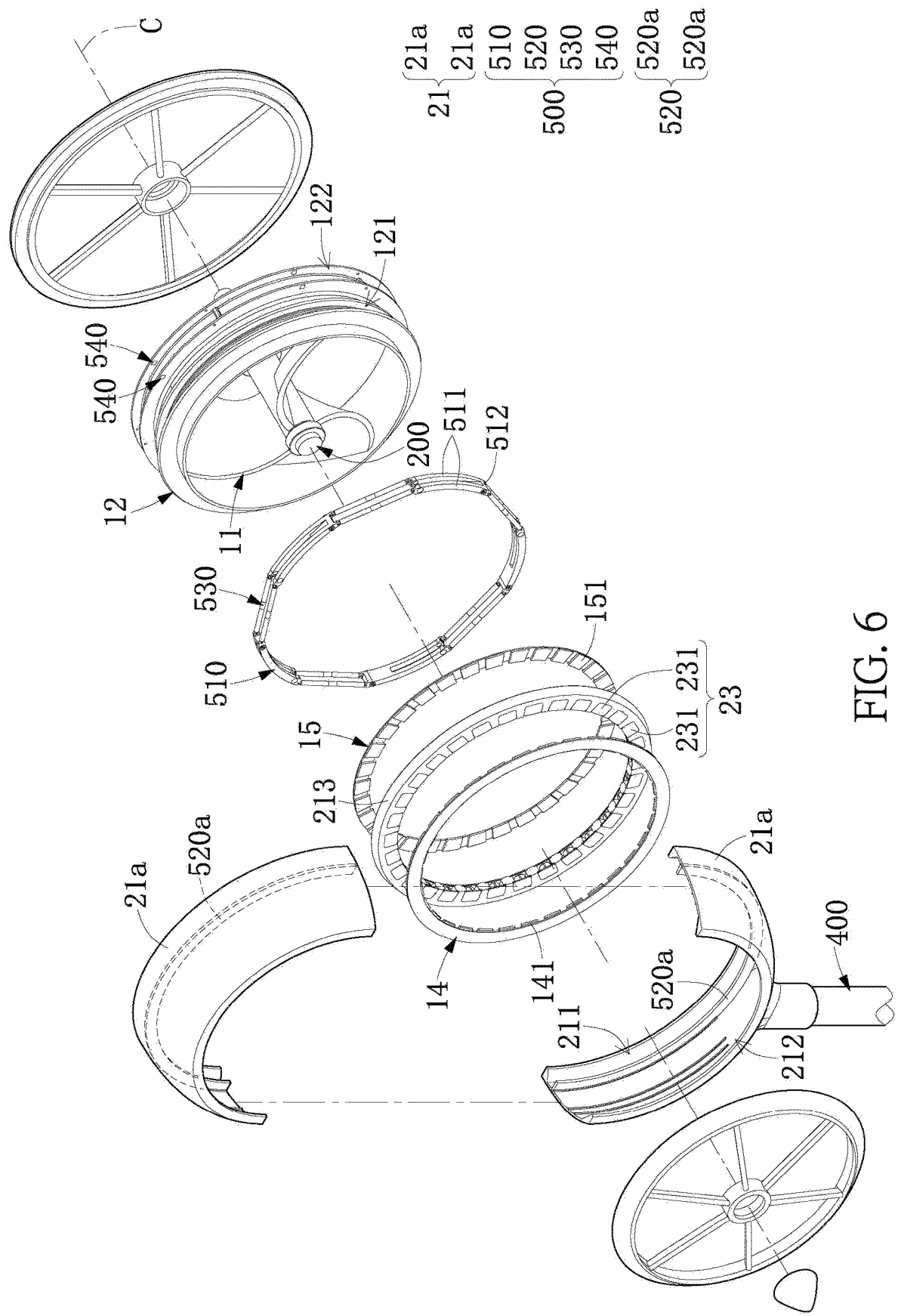
FIG. 6 is an exploded view of a wind power generation device and an acceleration restriction mechanism according to the first embodiment of the present disclosure.
Figure 7:
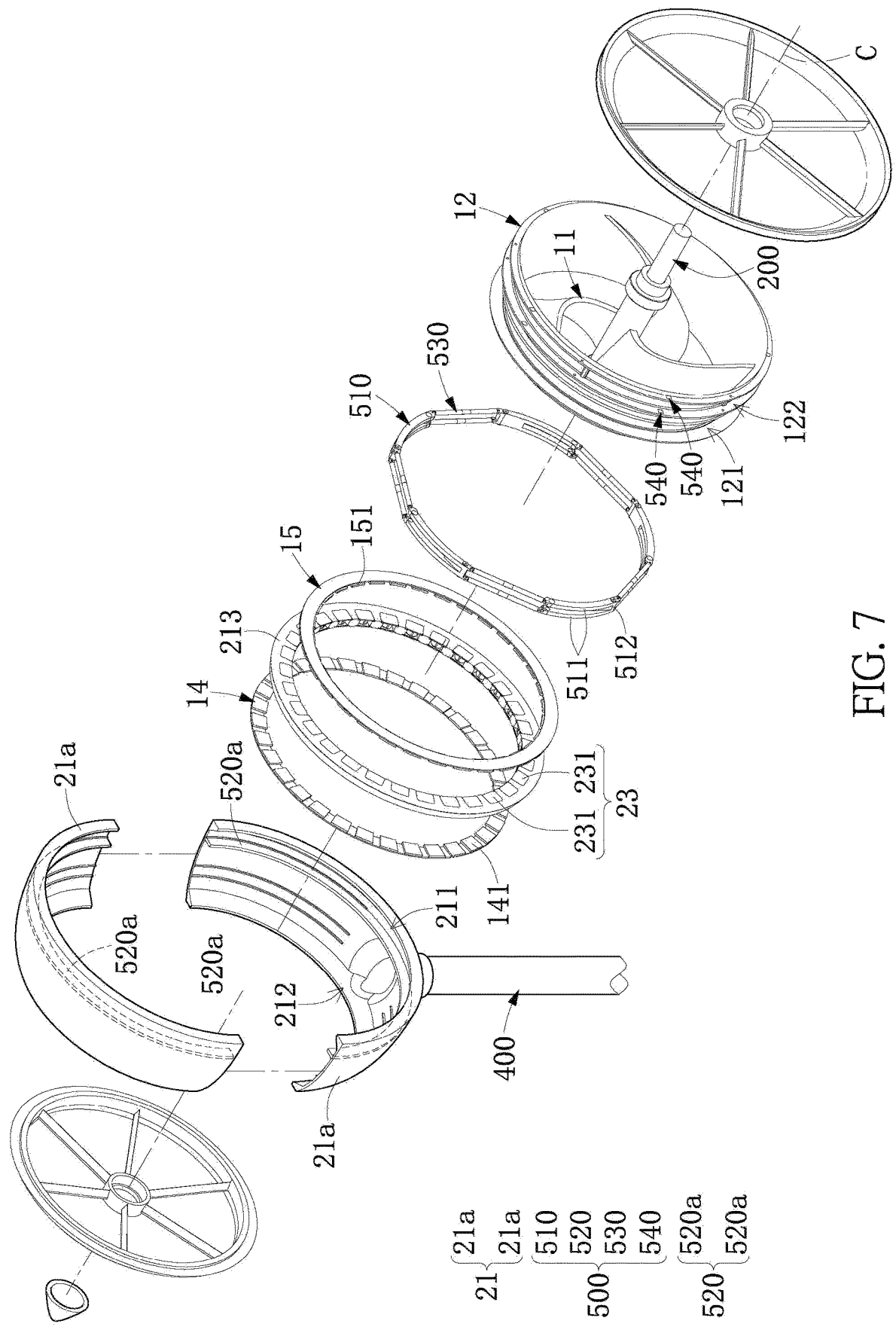
FIG. 7 is an exploded view of the wind power generation device and the acceleration restriction mechanism from another angle of view according to the first embodiment of the present disclosure.
Figure 8:
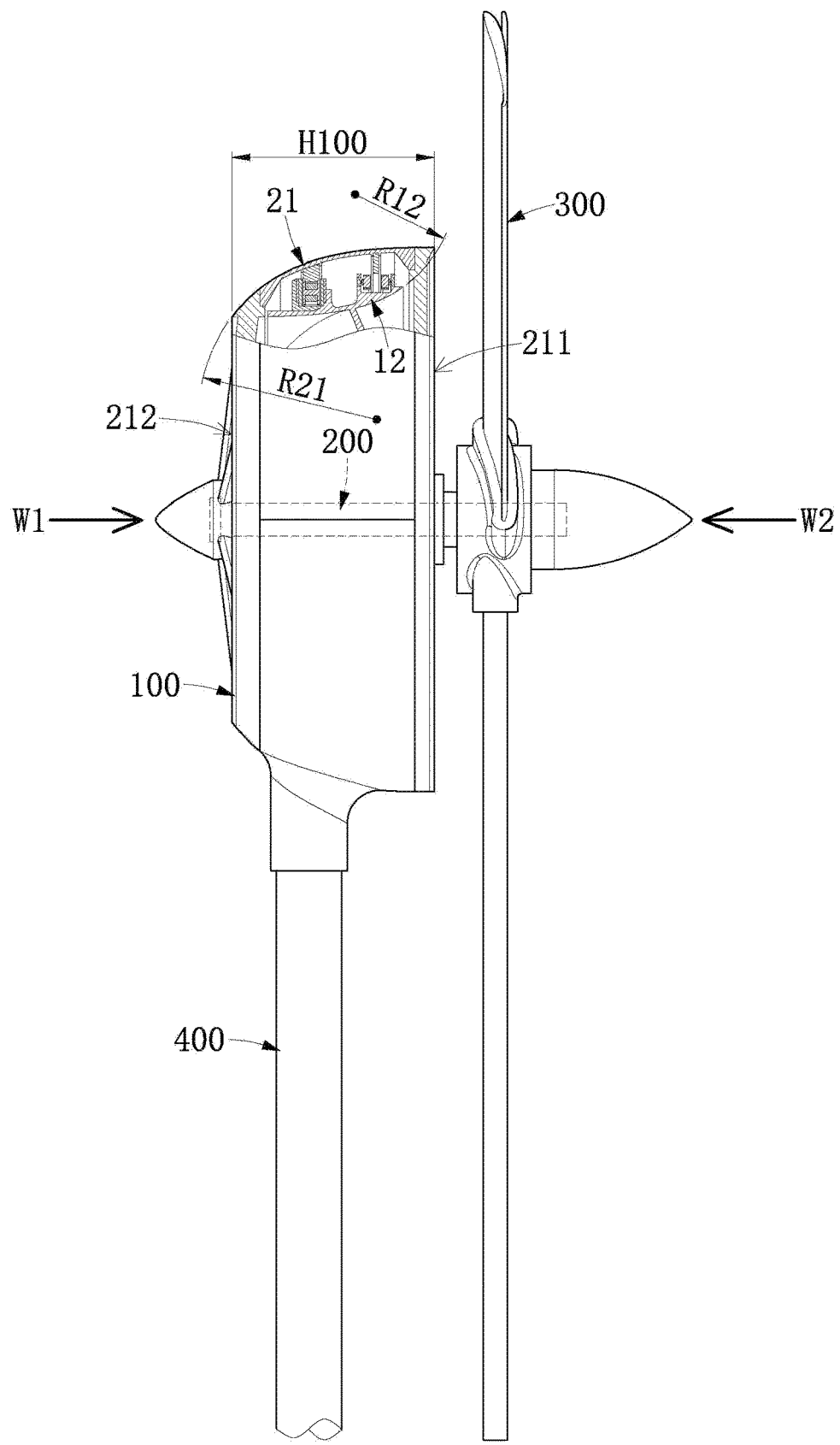
FIG. 8 is a partial cross-sectional view of the wind power generation apparatus according to the first embodiment of the present disclosure.

As shown in FIG. 5 to FIG. 7, the wind power generation device 100 includes a rotor assembly 1 and a stator assembly 2 that is in cooperation with the rotor assembly 1. An outer contour of the stator assembly 2 is in a substantial ring-shape, and the rotor assembly 1 is arranged inside of the stator assembly 2. The rotor assembly 1 in the present embodiment includes a drag blade 11, an inner housing 12, a first magnetically attractable module 14, and a second magnetically attractable module 15.

Figure 3:
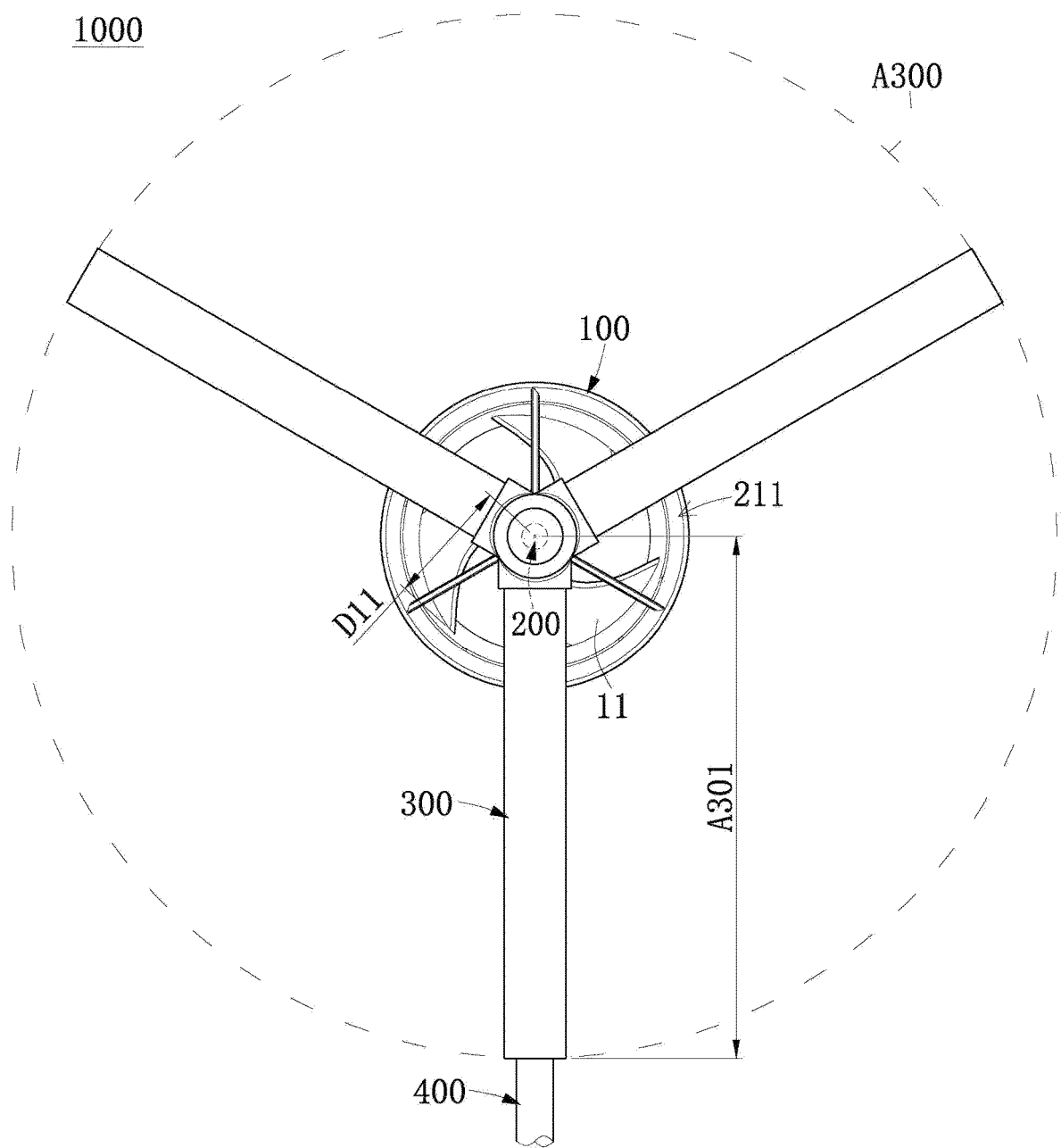
FIG. 3 is a planar view of FIG. 2.
Figure 4:
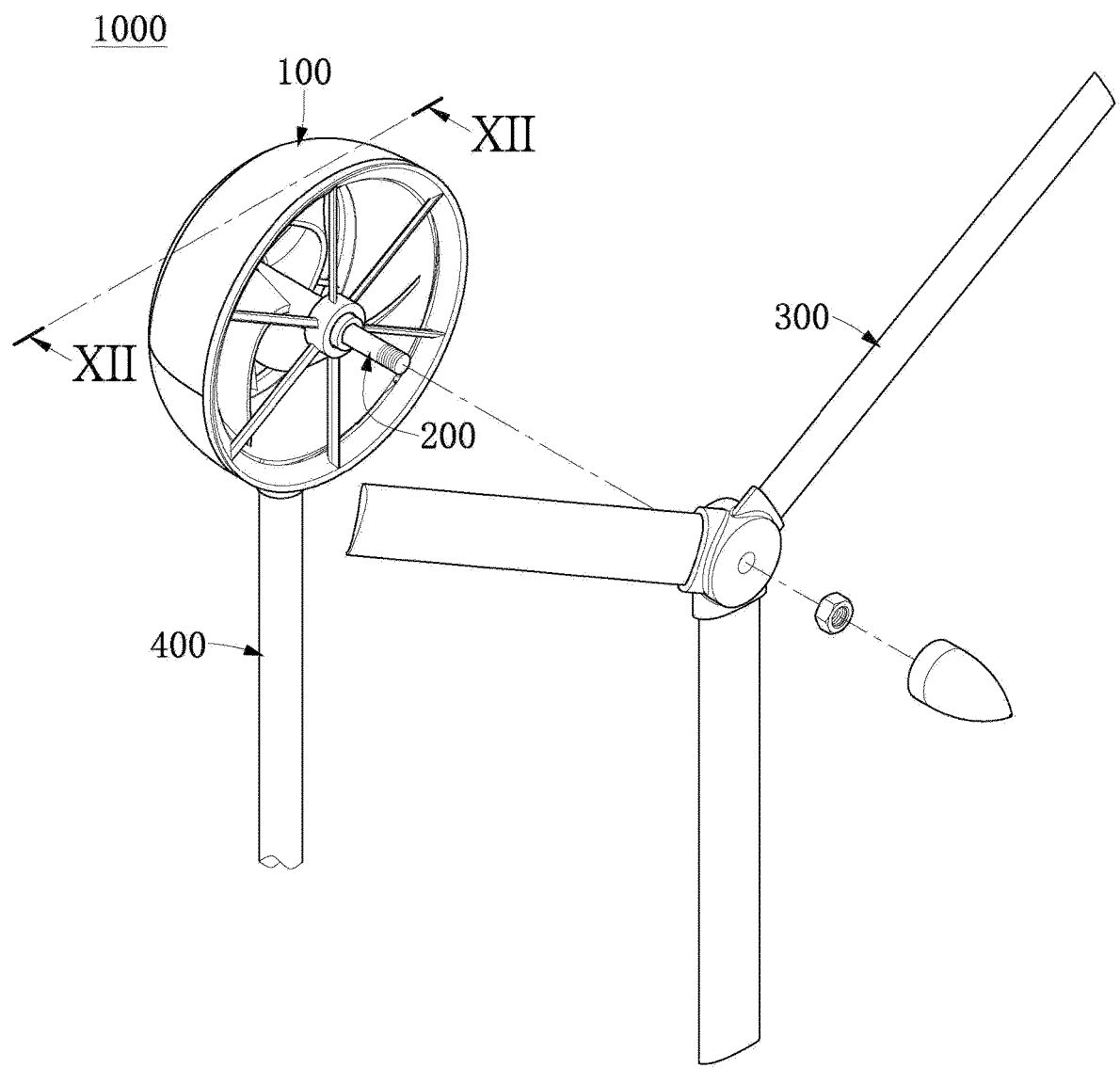
FIG. 4 is an exploded view of FIG. 2.

As shown in FIG. 3, the drag blade 11 in the present embodiment is in a spiral shape and is fixed on the rotating shaft 200 through at least two bearings (not labeled), so that the drag blade 11 and the lift blade set 300 can be simultaneously operated through the rotating shaft 200, and a rotation of the lift blade set 300 forms a sweeping area A300. A maximum distance D11 between an outer edge of the drag blade 11 and the rotating shaft 200 in the present embodiment is less than or equal to 70.7% of a radius A301 of the sweeping area A300. For example, the maximum distance D11 can be 12.5-70.7% of the radius A301, and is preferably 25-57.7% of the radius A301.

Accordingly, the drag blade 11 and the lift blade set 300 of the wind power generation apparatus 1000 are arranged according to the above positional relationship and are both fixed on the rotating shaft 200, so that when the wind power generation apparatus 1000 is in an environment with low speed wind (e.g., a speed of wind that is less than 7 m/s), the drag blade 11 can be used to provide a torque to add to a torque generated from the lift blade set 300 for increasing an electricity generation effect of the wind power generation apparatus 1000.

Figure 2:
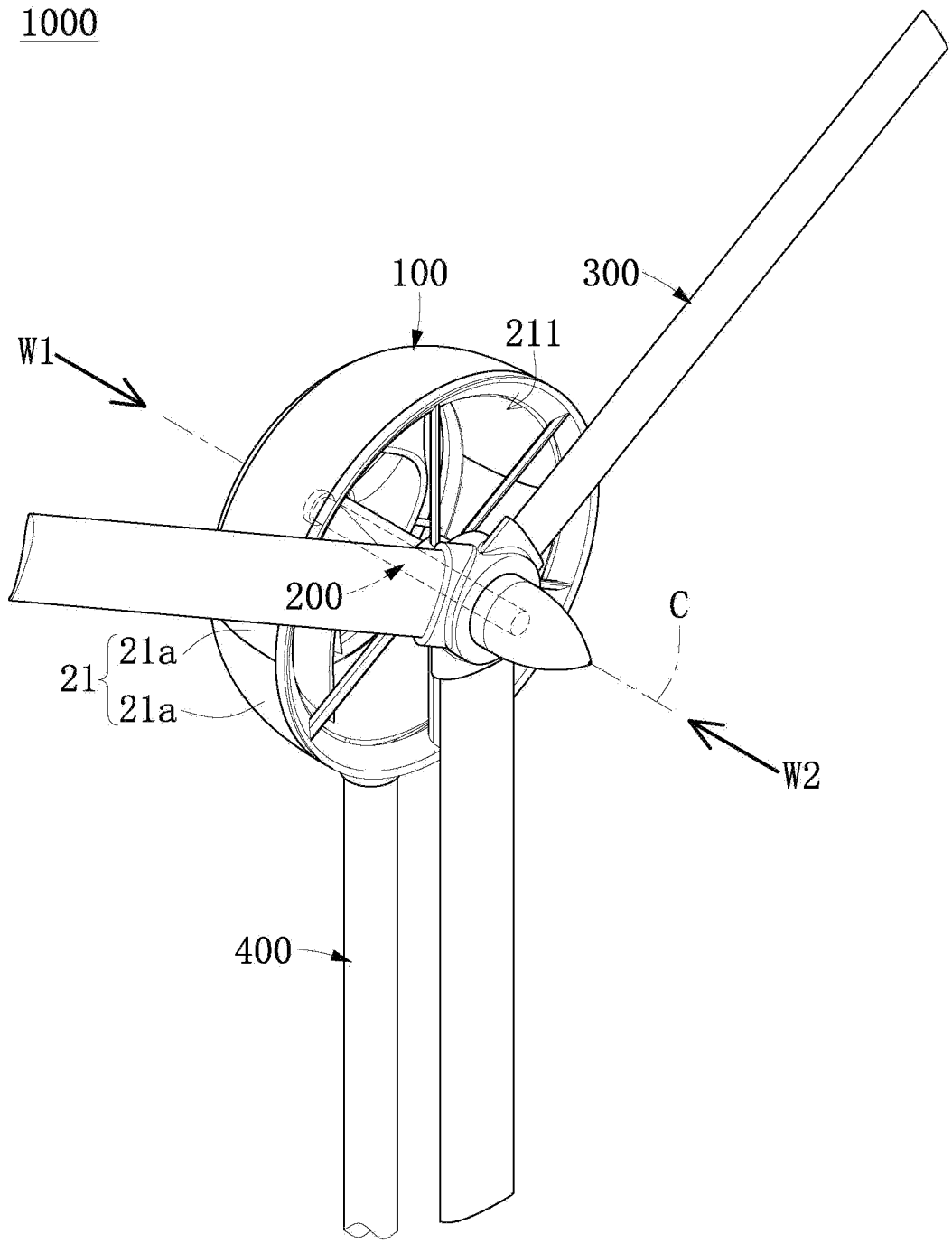
FIG. 2 is a perspective view of the wind power generation apparatus from another angle of view according to the first embodiment of the present disclosure.

More specifically, as shown in FIG. 1 and FIG. 2, two opposite sides of the lift blade set 300 (e.g., the left side and the right side of the lift blade set 300 shown in FIG. 1) in the present embodiment are respectively defined as a windward side W1 and a leeward side W2. The wind power generation device 100 is preferably arranged at the windward side W1, so that the drag blade 11 can receive (or be driven by) a wind force earlier than the lift blade set 300, but the present disclosure is not limited thereto.

As shown in FIG. 6 and FIG. 7, the inner housing 12 is in a ring-shape, and is connected to the outer edge of the drag blade 11. In the present embodiment, the drag blade 11 is arranged in the inner housing 12, and is integrally connected to the inner housing 12, but the present disclosure is not limited thereto. For example, in other embodiments of the present disclosure, the drag blade 11 can be fixed in the inner housing 12 by using a soldering manner, an ultrasonic welding manner, or other manners; or the drag blade 11 can slightly protrude from the inner housing 12.

Moreover, the inner housing 12 is substantially in a truncated cone shape, and a center axis of the inner housing 12 passes through the rotating shaft 200. A first area surrounded by an end of the inner housing 12 adjacent to the lift blade set 300 (e.g., the right circular end of the inner housing 12 shown in FIG. 7) is greater than a second area surrounded by another end of the inner housing 12 (e.g., the left circular end of the inner housing 12 shown in FIG. 6). An inner surface of the inner housing 12 is in an arc shape (shown in FIG. 8) and is connected to the drag blade 11. The inner housing 12 has a first retaining slot 121 and a second retaining slot 122 both formed on an outer surface thereof. Each of the first retaining slot 121 and the second retaining slot 122 is in a ring-shape, and has a slot opening facing in a direction away from the rotating shaft 200.

As shown in FIG. 6 to FIG. 9, the first magnetically attractable module 14 and the second magnetically attractable module 15 are assembled to the outer surface of the inner housing 12 (e.g., the first retaining slot 121) and are spaced apart from each other, and the first magnetically attractable module 14 and the second magnetically attractable module 15 face each other and have a magnetic force there-between. The rotor assembly 1 defines an annular gap 16 (shown in FIG. 9) between the first magnetically attractable module 14 and the second magnetically attractable module 15, and the annular gap 16 is located in a space surroundingly defined by the first retaining slot 121.

More specifically, the first magnetically attractable module 14 includes a plurality of first magnets 141 disposed on an inner lateral wall of the first retaining slot 121 and spaced apart from each other. The second magnetically attractable module 15 includes a plurality of second magnets 151 disposed on another inner lateral wall of the first retaining slot 121 and spaced apart from each other. Moreover, the second magnets 151 and the first magnets 141 respectively face toward each other and are spaced apart from each other.

It should be noted that each of the first magnetically attractable module 14 and the second magnetically attractable module 15 in the present embodiment are provided to include the magnets 141 and 151, but the present disclosure is not limited thereto. For example, in other embodiments of the present disclosure, one of the first magnetically attractable module 14 and the second magnetically attractable module 15 can include a plurality of magnets, and the other one of the first magnetically attractable module 14 and the second magnetically attractable module 15 can include a plurality of magnetic conductions (e.g., metal cores).

As shown in FIG. 5 to FIG. 7, the stator assembly 2 includes an outer housing 21 and an induction module 23. The outer housing 21 is in a ring-shape, and is sleeved around the inner housing 12. The supporting stand 400 in the present embodiment is fixed onto the outer housing 21 (shown in FIG. 2), but the present disclosure is not limited thereto.

More specifically, the outer housing 21 is substantially in a truncated cone shape, and a center axis of the outer housing 21 passes through the rotating shaft 200. The outer housing 21 has a large opening 211 and a small opening 212, which are respectively arranged on two opposite sides of the outer housing 21. A portion of the outer housing 21 having a maximum outer diameter D211 corresponds in position to the large opening 211, and another portion of the outer housing 21 having a minimum outer diameter D212 corresponds in position to the small opening 212. Moreover, the large opening 211 is arranged on one side of the outer housing 21 (e.g., the right side of the outer housing 21 shown in FIG. 2) adjacent to the lift blade set 300, and the small opening 212 is arranged on an opposite side of the outer housing 21 (e.g., the left side of the outer housing 21 shown in FIG. 1) away from the lift blade set 300.

It should be noted that the outer housing 21, the inner housing 12, and the drag blade 11 in the present embodiment can be further assembled with the following structures for more efficiently applying the wind power generation device 100 in an environment with a low speed wind.

An outer surface of the outer housing 21 is in an arc shape. In a cross section of the wind power generation device 100 parallel to the rotating shaft 200 (shown in FIG. 8), a radius R12 of a part of the inner surface of the inner housing 12 is less than a radius R21 of a part of the outer surface of the outer housing 21. Moreover, the large opening 211 and the small opening 212 of the outer housing 21 have a distance H100 there-between that is identical to a thickness of the wind power generation device 100. A difference between the maximum outer diameter D211 and the minimum outer diameter D212 (shown in FIG. 5) is greater than 0, and is less than or equal to the distance H100 multiplied by tan α. Specifically, the value of α should satisfy the following condition: 0 degrees≤α≤45 degrees, and the value of α preferably satisfies the following condition: 8 degrees≤α≤25 degrees.

In addition, when the drag blade 11 is orthogonally projected onto a region surrounded by the small opening 212 of the outer housing 21 (shown in FIG. 7) to form a projection region, an area of the projection region defined by the drag blade 11 is 10-70% (e.g., 25-66.7% is preferable) of an area of the region surrounded by the small opening 212. The number of the drag blade 11 of the wind power generation device 100 in the present embodiment is one, but the number of the drag blade 11 can be adjusted according to design requirements when the wind power generation device 100 satisfies the above conditions.

Figure 9:
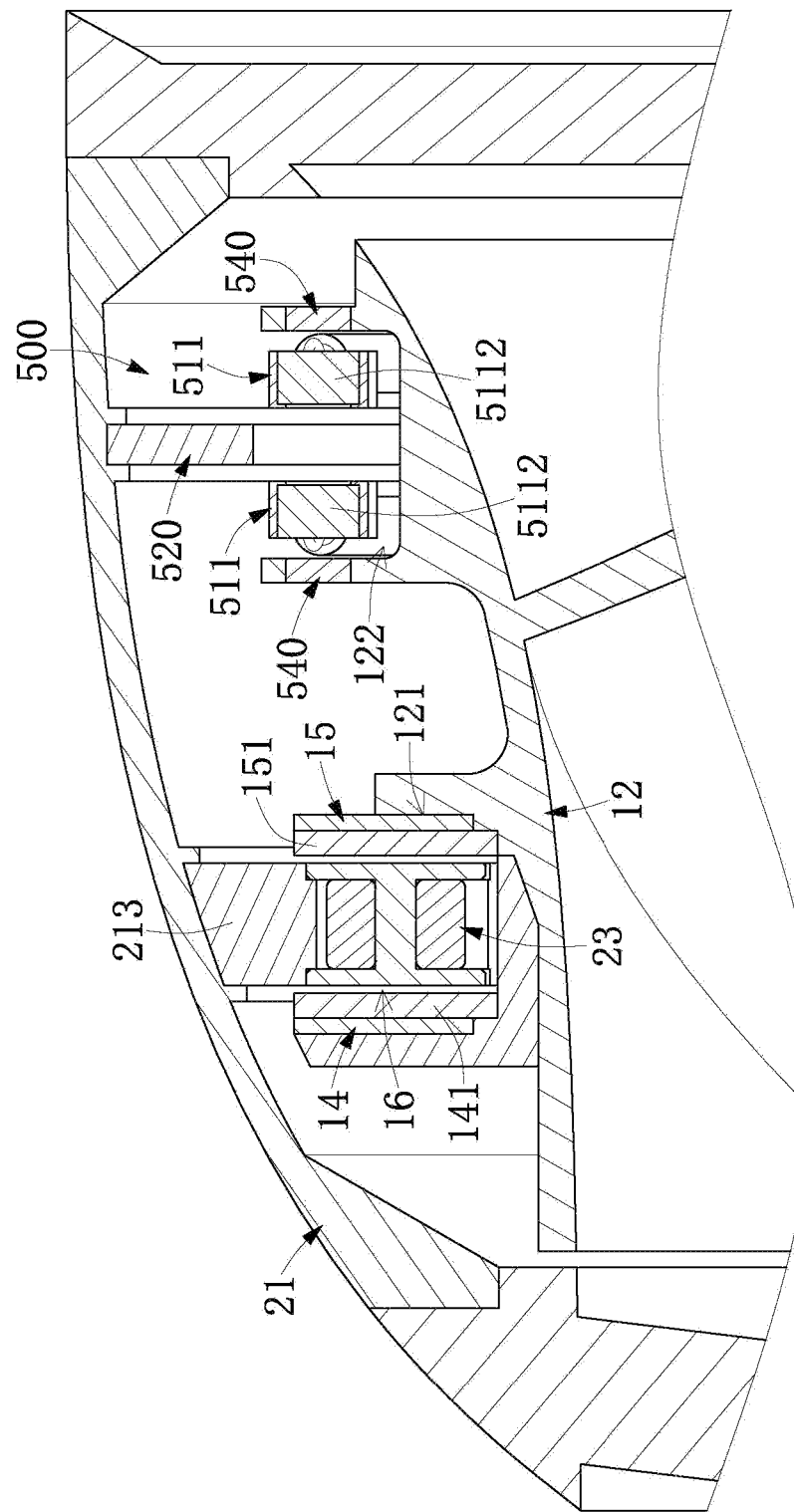
FIG. 9 is a cross-sectional enlarged view of a portion of FIG. 8.

As shown in FIG. 6, FIG. 7, and FIG. 9, the outer housing 21 includes a carrier 213 arranged on an inner side thereof and facing the annular gap 16 that is located in the first retaining slot 121. In the present embodiment, the outer housing 21 is formed by assembling with the carrier 213, and the carrier 213 is in a ring-shape and is at least partially arranged in the annular gap 16, but the present disclosure is not limited thereto.

Moreover, the induction module 23 is fixed on the carrier 213, and is arranged in the annular gap 16. In the present embodiment, the induction module 23 includes a plurality of induction coils 231 spaced apart from each other and fixed on a portion of the carrier 213 that is arranged in the annular gap 16.

Accordingly, when the drag blade 11 and the lift blade set 300 in the present embodiment are driven by a wind force, the rotor assembly 1 is rotated relative to the stator assembly 2 by taking the rotating shaft 200 as a rotation axis, and the region between the first magnetically attractable module 14 and the second magnetically attractable module 15 passes through the induction module 23 so as to allow the induction module 23 to generate an induction current.

As shown in FIG. 6, FIG. 7, and FIG. 9, the acceleration restriction mechanism 500 is disposed between the inner housing 12 and the outer housing 21 of the wind power generation device 100. The acceleration restriction mechanism 500 includes N number of swing structures 510 pivotally connected to the inner housing 12, a metal ring 520 fixed on the outer housing 21, a plurality of elastic members 530 connected to the swing structures 510, and a plurality of outer magnets 540 fixed on the inner housing 12. In the present embodiment, N is five, but the present disclosure is not limited thereto. For example, in other embodiments of the present disclosure, N can be a positive integer greater than one.

It should be noted that the acceleration restriction mechanism 500 in the present embodiment is limited to being assembled in the wind power generation device 100. Accordingly, any acceleration restriction mechanism not assembled in the wind power generation device 100 (e.g., an acceleration restriction mechanism assembled on a portion of the rotating shaft 200 that is arranged outside of the wind power generation device 100) is different from the acceleration restriction mechanism 500 of the present embodiment.

As the swing structures 510 are of the same structure, the following description discloses the structure of only one of the swing structures 510 for the sake of brevity. The swing structure 510 includes two swing arms 511 and a connecting rod 512 connected to the two swing arms 511. That is to say, the two swing arms 511 of the swing structure 510 can be simultaneously movable (or swingable) through the connecting rod 512. Moreover, the two swing arms 511 of the swing structure 510 are preferably mirror-symmetrical with respect to the connecting rod 512, but the present disclosure is not limited thereto. For example, in other embodiments of the present disclosure, the swing structure 510 can include at least one swing arm 511 and not include the connecting rod 512.

Figure 10:
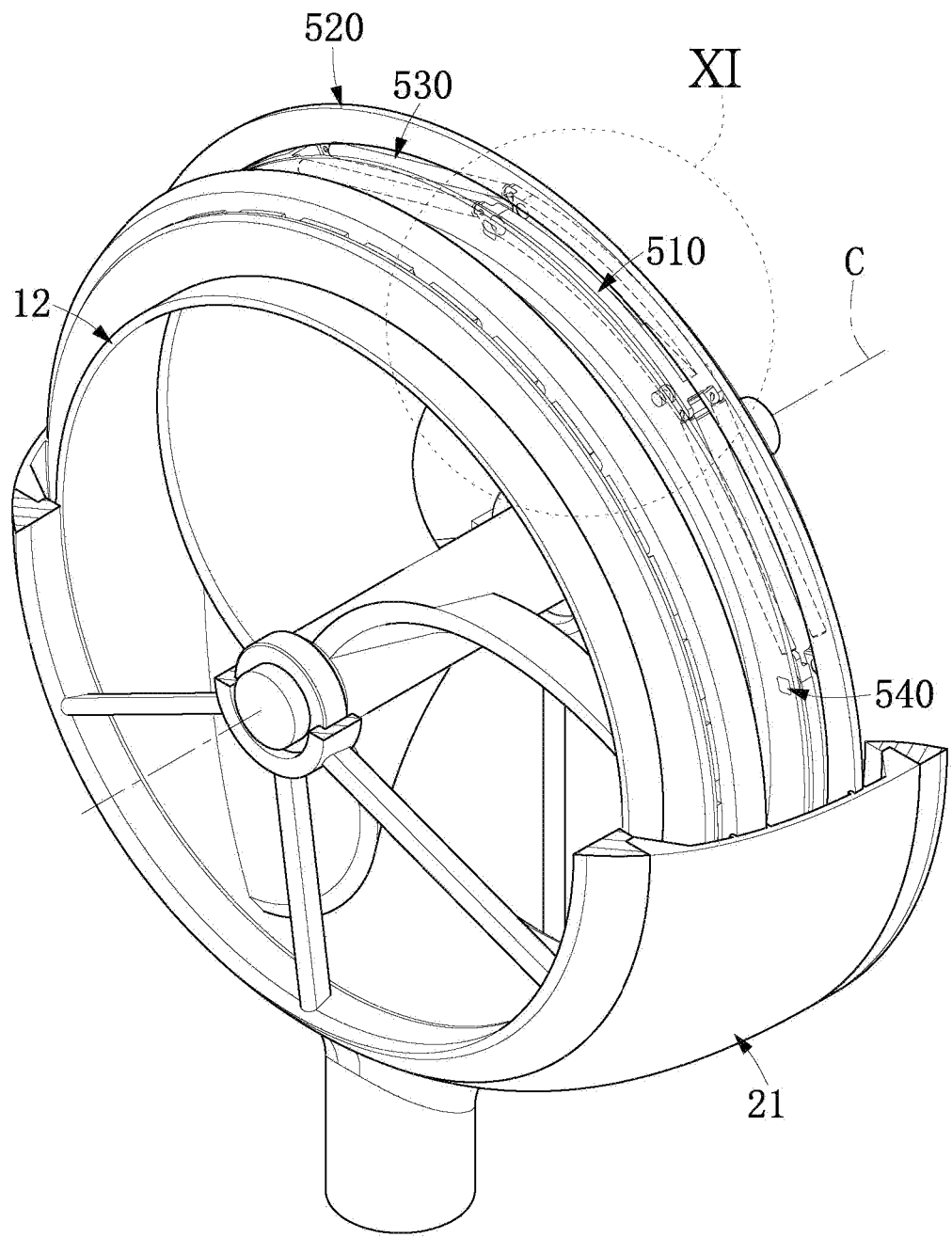
FIG. 10 is a partial cross-sectional view of FIG. 1 when the lift blade set is omitted.
Figure 11:
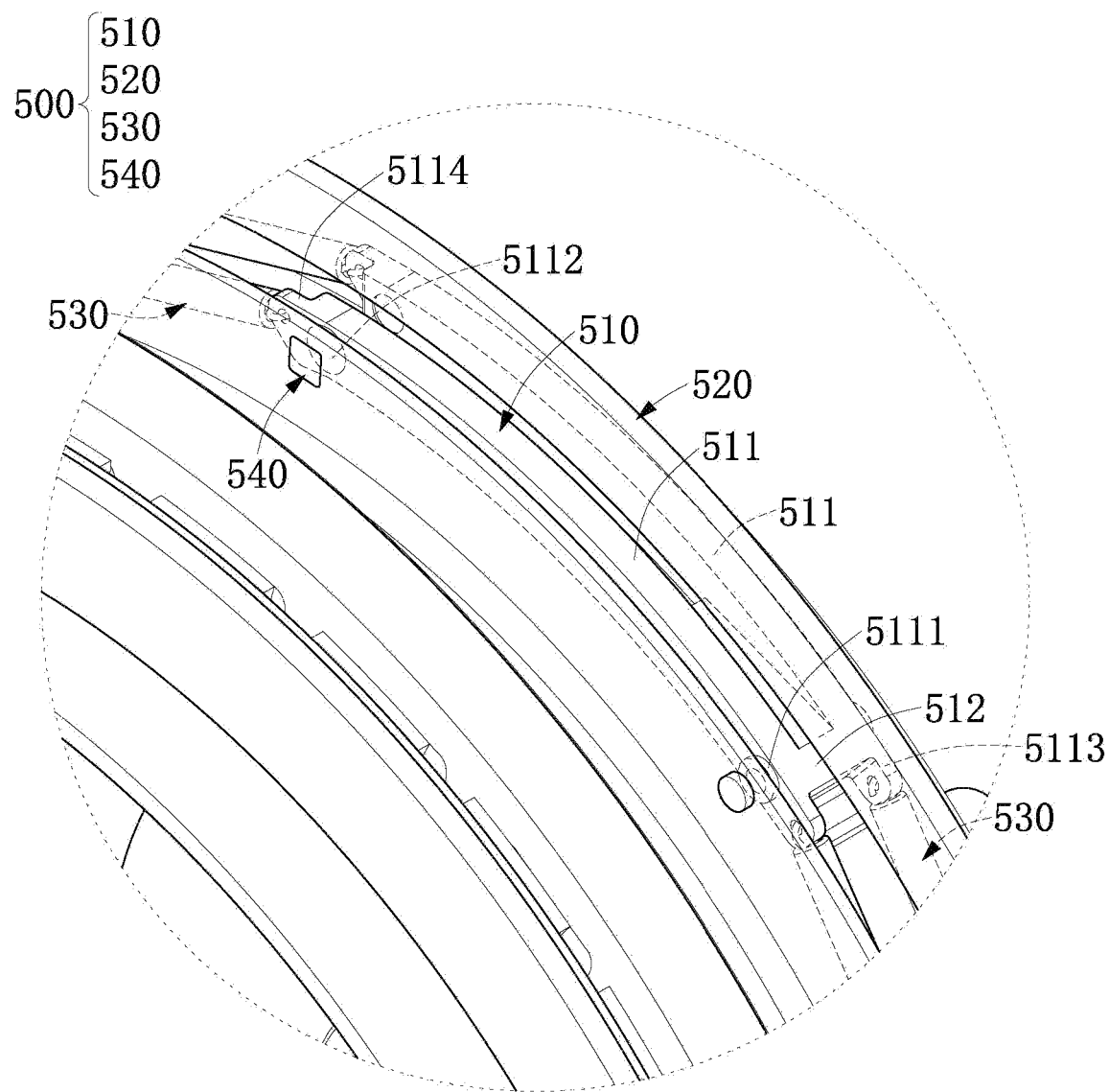
FIG. 11 is an enlarged view of portion XI of FIG. 10.
Figure 12:
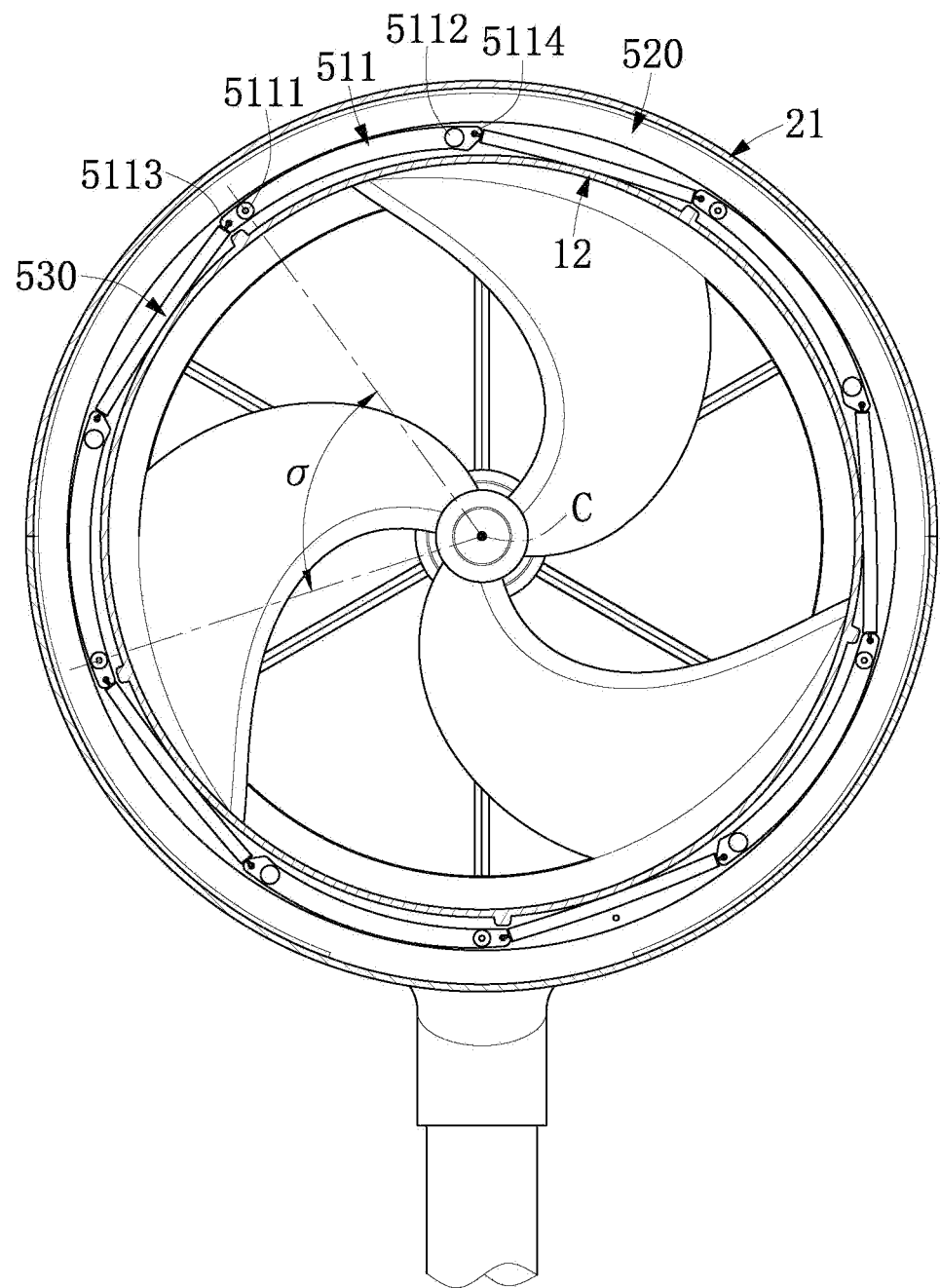
FIG. 12 is a cross-sectional view taken along line XII-XII of FIG. 4.

More specifically, as shown in FIG. 10 and FIG. 11, each of the two swing arms 511 includes a pivotal portion 5111 and a magnetic portion 5112, which are respectively arranged on two opposite sides thereof. The connecting rod 512 is connected to the pivotal portions 5111 of the two swing arms 511. Moreover, each of the two swing arms 511 in the present embodiment further includes a first end portion 5113 and a second end portion 5114 respectively arranged at two opposite outer sides of the magnetic portion 5111 and the pivotal portion 5112. In other words, as shown in FIG. 11, the first end portion 5113 and the pivotal portion 5111 are arranged on the right side portion of the swing arm 511, and the magnetic portion 5112 and the second end portion 5114 are arranged on the left side portion of the swing arm 511. Moreover, a portion of the swing structure 510 excluding the first end portions 5113 in the present embodiment is in a substantial U-shape.

The pivotal portion 5111 of each of the two swing arms 511 is pivotally connected to the inner housing 12 (e.g., the two pivotal portions 5111 of the swing structure 510 are pivotally connected to two inner lateral walls of the second retaining slot 122, respectively), so that the magnetic portion 5112 of each of the two swing arms 511 is movable relative to the inner housing 12 from an initial position (shown in FIG. 12) to an acceleration restriction position (shown in FIG. 13) by a centrifugal force that is generated from the rotor assembly 1 in rotation. It should be noted that two of the pivotal portions 5111 respectively belonging to two of the swing structures 510 adjacent to each other have an angle σ with respect to the rotating shaft 200, and the angle σ is 360/N degrees.

Figure 13:
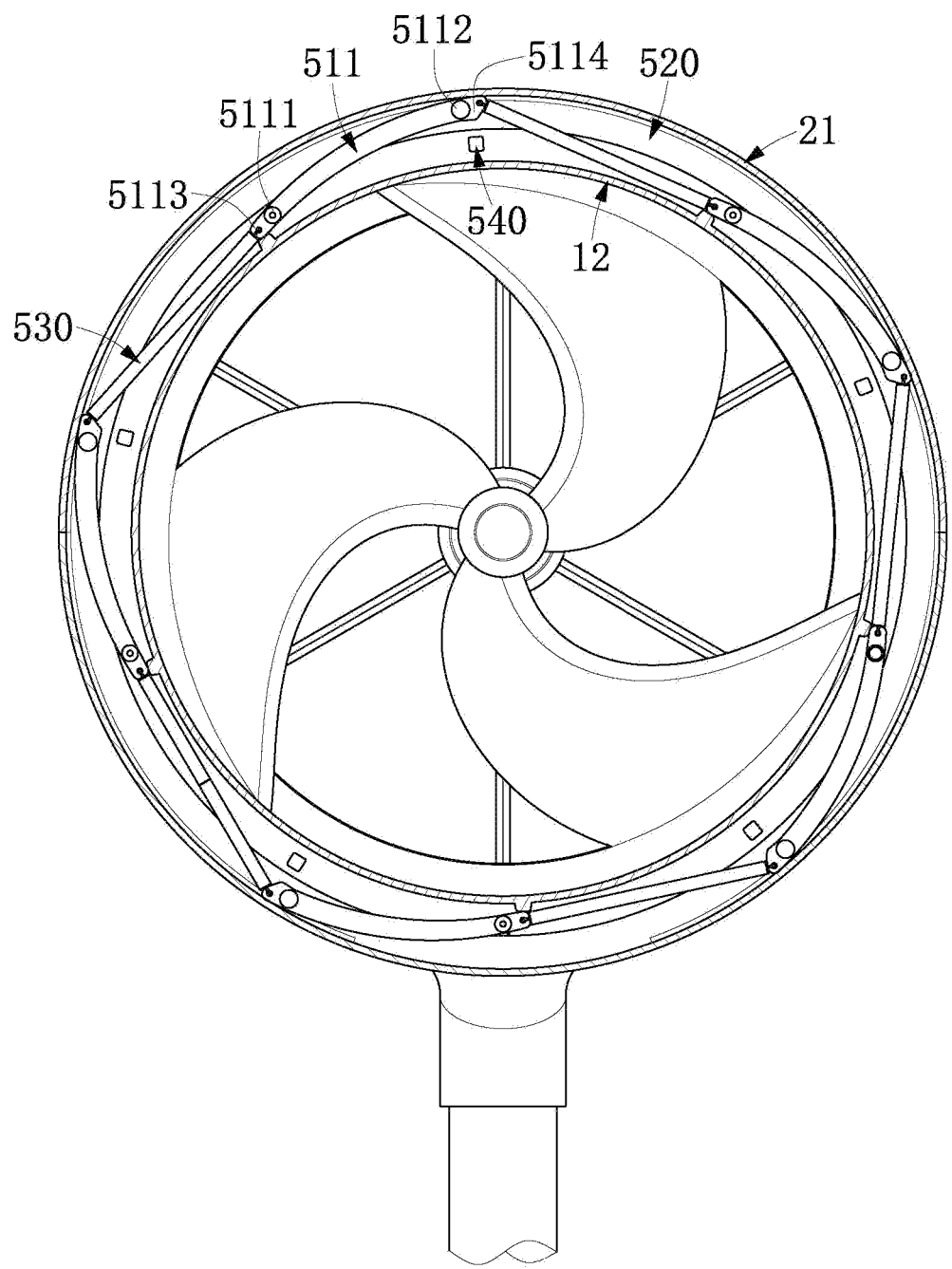
FIG. 13 is a cross-sectional view showing the wind power generation apparatus when a rotor assembly is rotated according to the first embodiment of the present disclosure.

As shown in FIG. 9 to FIG. 12, when the magnetic portion 5112 of each of the swing arms 511 is at the initial position, the swing structure 510 is substantially arranged in the second retaining slot 122 of the inner housing 12. Moreover, as shown in FIG. 13, when the magnetic portion 5112 of each of the swing arms 511 is at the acceleration restriction position, the magnetic portion 5112 of each of the swing arms 511 at least partially covers the metal ring 520 along the axial direction C, so that the metal ring 520 generates an eddy current limiting a rotating acceleration of the rotor assembly 1.

Accordingly, the eddy current generated from the metal ring 520 can be used to reduce the rotating acceleration of the rotor assembly 1, so that the wind power generation apparatus 1000 is suitable to be operated in continuously high speed winds. Moreover, a magnitude of the eddy current can affect the degree of reduction of the rotating acceleration of the rotor assembly 1, and can be adjusted by changing an area of the metal ring 520 that interacts with each of the magnetic portions 5112 along the axial direction C, so that the acceleration restriction mechanism 500 in the present embodiment can further include the following components for achieving a specific value of the eddy current, but the present disclosure is not limited thereto.

The swing structures 510 of the acceleration restriction mechanism 500 can be operated as one piece through the elastic members 530 (e.g., tension springs), so that when the swing structures 510 are swung by the centrifugal force, each of the swing structures 510 can be swung with an approximately same amplitude. In the present embodiment, the first end portion 5113 and the second end portion 5114 that respectively belong to two of the swing structures 510 and that are adjacent to each other are connected to each other by one of the elastic members 530, but the present disclosure is not limited thereto.

Moreover, the outer magnets 540 are fixed on the inner housing 12 (e.g., the two inner lateral walls of the second retaining slot 122), and each of the swing structures 510 corresponds in position to two of the outer magnets 540. However, in other embodiments of the present disclosure, each of the swing structures 510 can correspond in position to at least two of the outer magnets 540.

More specifically, when the magnetic portions 5112 of each of the swing structures 510 are at the initial position, the two corresponding outer magnets 540 are located at two opposite outer sides of the magnetic portions 5112 of the two swing arms 511, and are magnetically attracted with the magnetic portions 5112 of the two swing arms 511. In other words, since the magnetic portions 5112 of each of the swing structures 510 are magnetically attracted with the two corresponding outer magnets 540, each of the swing structures 510 can be controlled to swing outwardly when under a specific speed of wind. Accordingly, the wind power generation apparatus 1000 can be applied to different requirements.

In addition, as shown in FIG. 6 and FIG. 7, to produce the wind power generation apparatus 1000 of the present embodiment more easily, the outer housing 21 can include two sub-cases 21a assembled with each other, the metal ring 520 can include two sub-rings 520a respectively fixed on the two sub-cases 21a so that any one of the two sub-cases 21a and the corresponding sub-ring 520a can be directly produced, and the two sub-cases 21a and the two sub-rings 520a are assembled to each other so as to form the outer housing 21 and the metal ring 520, but the present disclosure is not limited thereto. For example, in other embodiments of the present disclosure, each of the outer housing 21 and the metal ring 520 can be integrally formed as a one-piece structure.

In the present embodiment, two ends of one of the two sub-rings 520a are respectively connected to two ends of the other one of the two sub-rings 520a. In other words, the metal ring 520 in the present embodiment is formed by two individual sub-rings 520a, but the two sub-rings 520a are connected to each other so as to form a ring-shaped structure.

It should be noted that the metal ring 520 in the present embodiment interacts with the magnetic portion 5112 of each of the swing arms 511 for generating the eddy current, but the present disclosure is not limited thereto. For example, the magnetic portion 5112 of each of the swing arms 511 can be replaced by a metal portion 5112 that is also movable relative to the inner housing 12 from an initial position to an acceleration restriction position, and the metal ring 520 can be replaced by a magnetic ring 520. Accordingly, when the metal portion 5112 of each of the swing arms 511 is at the acceleration restriction position, the metal portion 5112 at least partially covers the magnetic ring 520 along the axial direction C, so that the metal portion 5112 generates an eddy current that can limit a rotating acceleration of the rotor assembly 1.

Second Embodiment

Figure 14:
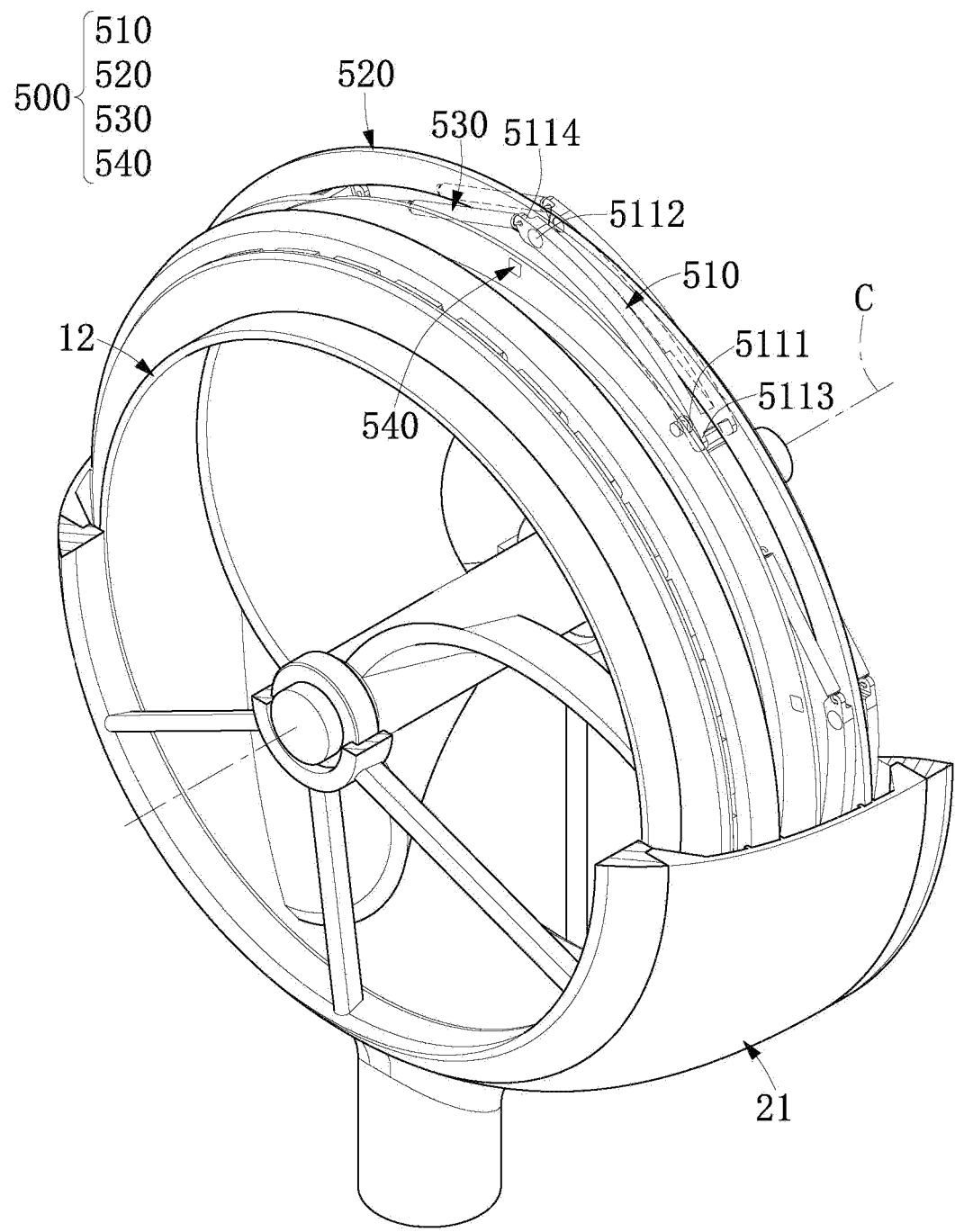
FIG. 14 is a partial cross-sectional view of a wind power generation apparatus when a lift blade set is omitted according to a second embodiment of the present disclosure.

Referring to FIG. 14, a second embodiment of the present disclosure is similar to the first embodiment of the present disclosure, so that descriptions of the same components in the first and second embodiments of the present disclosure will be omitted for the sake of brevity, and the following description only discloses different features between the first and second embodiments (e.g., connections between the elastic members 530 and the corresponding components of the present embodiment are different from that of the first embodiment).

Specifically, in the present embodiment, one end of each of the elastic members 530 is connected to the inner housing 12, and another end of each of the elastic members 530 is connected to a portion (e.g., the second end portion 5114) of one of the swing structures 510 arranged adjacent to the magnetic portion 5112.

Third Embodiment

Figure 15:
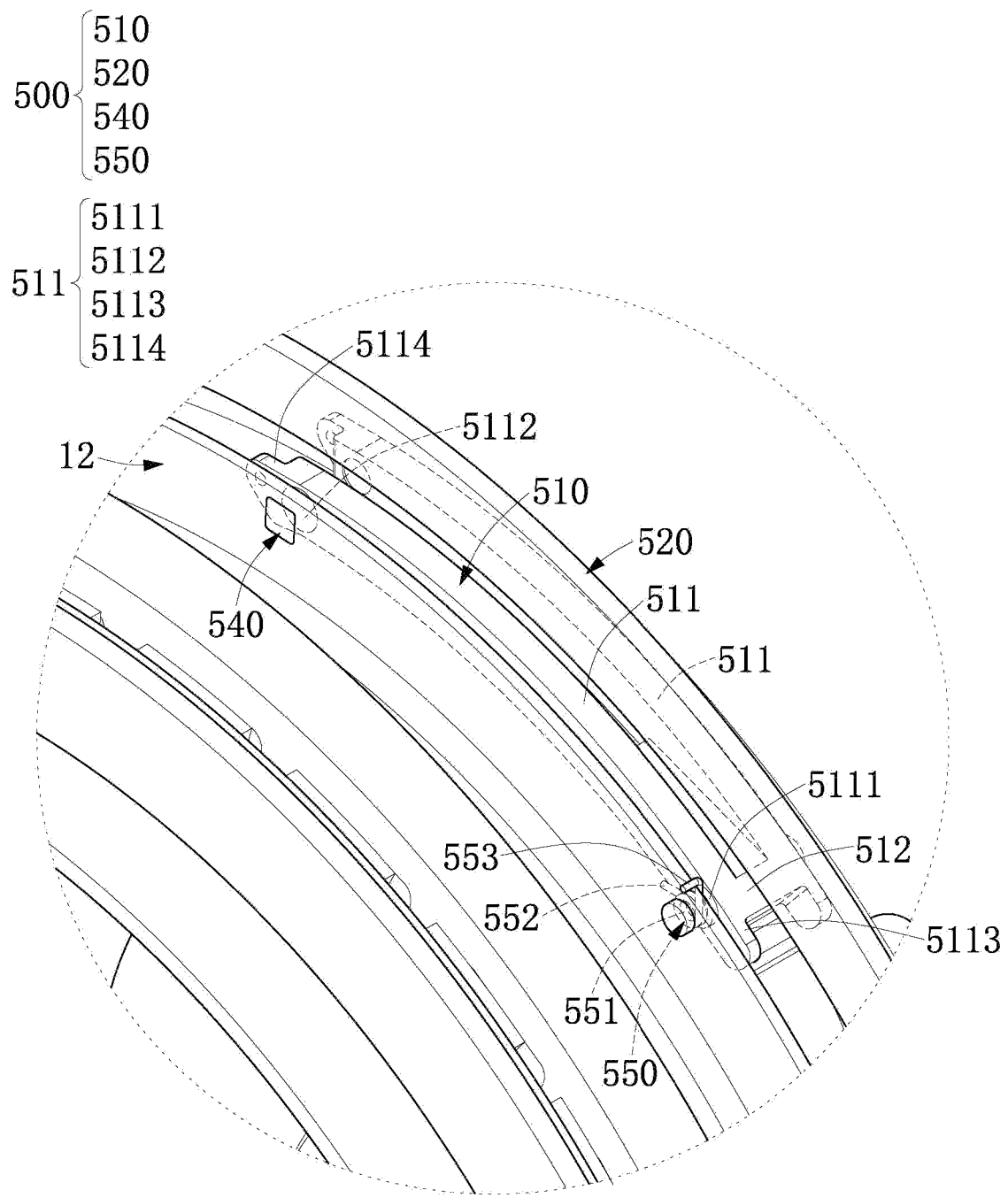
FIG. 15 is an enlarged view of a wind power generation apparatus according to a third embodiment of the present disclosure.

Referring to FIG. 15, a third embodiment of the present disclosure is similar to the first embodiment of the present disclosure, so that descriptions of the same components in the first and third embodiments of the present disclosure will be omitted for the sake of brevity, and the following description only discloses different features between the first and third embodiments (e.g., the acceleration restriction mechanism 500 in the present embodiment includes a plurality of torsion springs 550 respectively assembled to the swing structures 510 and used to replace the elastic members 530 of the first embodiment).

Specifically, in the present embodiment, each of the swing arms 511 is assembled with one of the torsion springs 550. Each of the torsion springs 550 includes an elastic portion 551, a first positioning portion 552, and a second positioning portion 553, the latter two of which respectively extend from two ends of the elastic portion 551. Moreover, in each of the swing arms 511 and the corresponding torsion spring 550, the elastic portion 551 is disposed on the pivotal portion 5111, the first positioning portion 552 is fixed to the swing arm 511, and the second positioning portion 553 is assembled to the inner housing 12.

Fourth Embodiment

Figure 16:
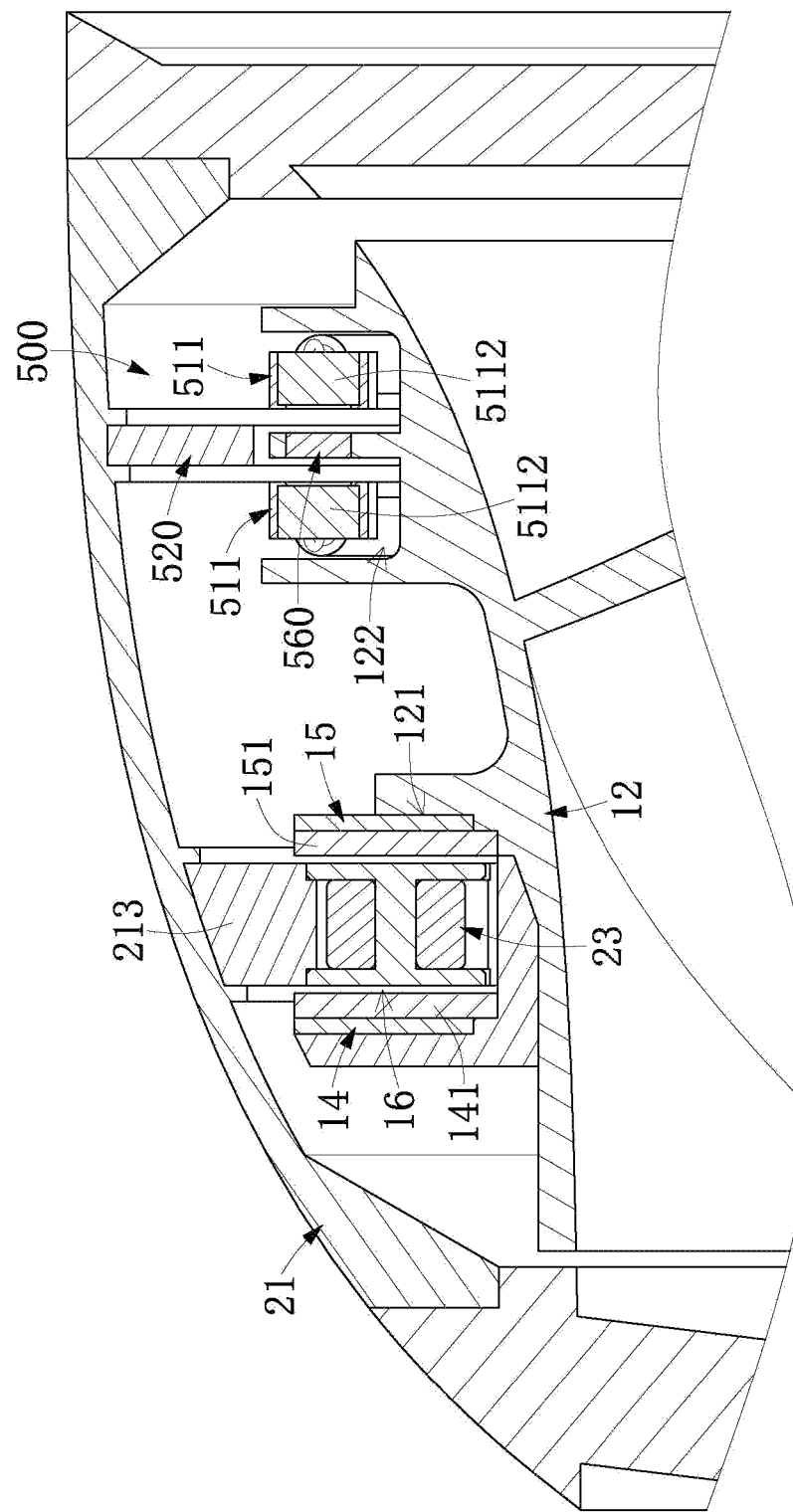
FIG. 16 is a cross-sectional enlarged view of a wind power generation apparatus according to a fourth embodiment of the present disclosure.

Referring to FIG. 16, a fourth embodiment of the present disclosure is similar to the first embodiment of the present disclosure, so that descriptions of the same components in the first and fourth embodiments of the present disclosure will be omitted for the sake of brevity, and the following description only discloses different features between the first and fourth embodiments (e.g., the acceleration restriction mechanism 500 in the present embodiment includes a plurality of inner magnets 560 fixed on the inner housing 12 and used to replace the outer magnets 540 of the first embodiment).

Specifically, each of the swing structures 510 in the present embodiment corresponds in position to one of the inner magnets 560. However, in other embodiments of the present disclosure, each of the swing structures 510 can correspond in position to at least one of the inner magnets 560.

Moreover, when the magnetic portions 5112 of each of the swing structures 510 are at the initial position, the corresponding inner magnet 560 is located in-between and is magnetically attracted with the magnetic portions 5112 of the two swing arms 511. In other words, since the magnetic portions 5112 of each of the swing structures 510 and the corresponding inner magnets 560 are magnetically attracted with each other, each of the swing structures 510 can be controlled to swing outwardly when under a specific speed of wind. Accordingly, the wind power generation apparatus 1000 can be applied to different requirements.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wind power generation apparatus, comprising:
    a rotating shaft defining an axial direction parallel to a longitudinal direction thereof;
    a wind power generation device assembled to the rotating shaft and comprising:
        a rotor assembly comprising:
            a drag blade being in a spiral shape and fixed on the rotating shaft;
            an inner housing being in a ring-shape and connected to an outer edge of the drag blade; and
            a first magnetically attractable module and a second magnetically attractable module that are assembled to an outer surface of the inner housing and are spaced apart from each other, wherein the first magnetically attractable module and the second magnetically attractable module face each other and have a magnetic force there-between; and
        a stator assembly comprising:
            an outer housing sleeved around the inner housing; and
            an induction module fixed on an inner surface of the outer housing, wherein when the drag blade is driven by a wind force, the rotor assembly is rotated relative to the stator assembly by taking the rotating shaft as a rotation axis, and a region between the first magnetically attractable module and the second magnetically attractable module passes through the induction module so as to allow the induction module to generate an induction current; and
        an acceleration restriction mechanism disposed between the inner housing and the outer housing and comprising:
            N number of swing structures each having at least one swing arm, wherein N is a positive integer greater than one, and the at least one swing arm of each of the swing structures comprises a pivotal portion and a magnetic portion, and wherein in the at least one swing arm of each of the swing structures, the pivotal portion is pivotally connected to the inner housing, and the magnetic portion is movable relative to the inner housing from an initial position to an acceleration restriction position by a centrifugal force that is generated from the rotor assembly in rotation; and
            a metal ring fixed on the outer housing, wherein when the magnetic portion of the at least one swing arm of each of the swing structures is at the acceleration restriction position, the magnetic portion at least partially covers the metal ring along the axial direction, so that the metal ring generates an eddy current limiting a rotating acceleration of the rotor assembly.

2. The wind power generation apparatus according to claim 1, wherein two of the pivotal portions that respectively belong to two of the swing structures adjacent to each other have an angle with respect to the rotating shaft, and the angle is 360/N degrees.

3. The wind power generation apparatus according to claim 1, wherein the at least one swing arm of each of the swing structures comprises a first end portion and a second end portion respectively arranged at two opposite outer sides of the magnetic portion and the pivotal portion, the acceleration restriction mechanism comprises a plurality of elastic members, and the first end portion and the second end portion respectively belonging to two of the swing structures and being adjacent to each other are connected to one of the elastic members.

4. The wind power generation apparatus according to claim 1, wherein the acceleration restriction mechanism comprises a plurality of elastic members, one end of each of the elastic members is connected to the inner housing, and another end of each of the elastic members is connected to a portion of one of the swing structures arranged adjacent to the magnetic portion.

5. The wind power generation apparatus according to claim 1, wherein the acceleration restriction mechanism comprises a plurality of torsion springs respectively assembled to the swing structures, and each of the torsion springs comprises an elastic portion, a first positioning portion, and a second positioning portion, the first positioning portion and the second positioning portion respectively extending from two ends of the elastic portion, and wherein in each of the swing structures and the corresponding torsion spring, the elastic portion is disposed on the pivotal portion, the first positioning portion is fixed to the at least one swing arm, and the second positioning portion is assembled to the inner housing.

6. The wind power generation apparatus according to claim 1, wherein the outer housing comprises two sub-cases assembled with each other, the metal ring comprises two sub-rings respectively fixed on the two sub-cases, and two ends of one of the two sub-rings are respectively connected to two ends of another one of the two sub-rings.

7. The wind power generation apparatus according to claim 1, wherein the number of the at least one swing arm of each of the swing structures is two, and each of the swing structures comprises a connecting rod connected to the two swing arms thereof, so that the two swing arms of each of the swing structures are simultaneously movable relative to the inner housing through the connecting rod.

8. The wind power generation apparatus according to claim 7, wherein the acceleration restriction mechanism comprises a plurality of inner magnets fixed on the inner housing, and each of the swing structures corresponds in position to at least one of the inner magnets; wherein when the magnetic portions of each of the swing structures are at the initial position, the two swing arms are mirror-symmetrical with respect to the connecting rod, and the at least one corresponding inner magnet is located between and is magnetically attracted to the magnetic portions of the two swing arms.

9. The wind power generation apparatus according to claim 7, wherein the acceleration restriction mechanism comprises a plurality of outer magnets fixed on the inner housing, and each of the swing structures corresponds in position to at least two of the outer magnets, and wherein when the magnetic portions of each of the swing structures are at the initial position, the two swing arms are mirror-symmetrical with respect to the connecting rod, and the at least two corresponding outer magnets are located at two opposite outer sides of the magnetic portions of the two swing arms and are magnetically attracted to the magnetic portions of the two swing arms.

10. A wind power generation apparatus, comprising:
a rotating shaft defining an axial direction parallel to a longitudinal direction thereof;
a wind power generation device assembled to the rotating shaft and comprising:
a rotor assembly comprising:
a drag blade being in a spiral shape and fixed on the rotating shaft;
an inner housing being in a ring-shape and connected to an outer edge of the drag blade; and
a first magnetically attractable module and a second magnetically attractable module that are assembled to an outer surface of the inner housing and that are spaced apart from each other, wherein the first magnetically attractable module and the second magnetically attractable module face each other and have a magnetic force there-between; and
a stator assembly comprising:
an outer housing sleeved around the inner housing; and
an induction module fixed on an inner surface of the outer housing, wherein when the drag blade is driven by a wind force, the rotor assembly is rotated relative to the stator assembly by taking the rotating shaft as a rotation axis, and a region between the first magnetically attractable module and the second magnetically attractable module passes through the induction module so as to allow the induction module to generate an induction current; and
an acceleration restriction mechanism disposed between the inner housing and the outer housing and comprising:
N number of swing structures each having at least one swing arm, wherein N is a positive integer greater than one, and the at least one swing arm of each of the swing structures comprises a pivotal portion and a metal portion, and wherein in the at least one swing arm of each of the swing structures, the pivotal portion is pivotally connected to the inner housing, and the metal portion is movable relative to the inner housing from an initial position to an acceleration restriction position by a centrifugal force that is generated from the rotor assembly in rotation; and
a magnetic ring fixed on the outer housing, wherein when the metal portion of the at least one swing arm of each of the swing structures is at the acceleration restriction position, the metal portion at least partially covers the magnetic ring along the axial direction, so that the metal portion generates an eddy current limiting a rotating acceleration of the rotor assembly.

* * * * *